United States Patent [19]

Miettaux

[11] Patent Number: 4,928,887
[45] Date of Patent: May 29, 1990

[54] CYLINDRICAL GUIDE DEVICE WITH OPERATING PLAY COMPENSATION FOR FUEL INJECTION SYSTEM

[75] Inventor: Marc Miettaux, Decines, France

[73] Assignee: Renault Vehicules Industriels, Lyon, France

[21] Appl. No.: 279,062

[22] Filed: Dec. 2, 1988

[30] Foreign Application Priority Data

Dec. 4, 1987 [FR] France .................................. 87-16859

[51] Int. Cl.⁵ ...................... F08M 59/44; F08M 61/16
[52] U.S. Cl. .................................... 239/584; 239/585; 239/533.2
[58] Field of Search .................. 239/584, 585, 533.3, 239/533.6, 533.7, 533.8, 533.9, 533.11, 533.12, 533.2; 251/129.15

[56] References Cited

U.S. PATENT DOCUMENTS

| | | | |
|---|---|---|---|
| 3,053,463 | 9/1962 | Milleville | 239/584 |
| 4,811,899 | 3/1989 | Egler | 239/585 |

FOREIGN PATENT DOCUMENTS

| | | | |
|---|---|---|---|
| 2920702 | 11/1980 | Fed. Rep. of Germany . | |
| 886831 | 10/1943 | France . | |
| 2190167 | 1/1974 | France . | |
| 0155272 | 9/1983 | Japan | 239/585 |

Primary Examiner—Andres Kashnikow
Assistant Examiner—Karen B. Merritt
Attorney, Agent, or Firm—Oblon, Spivak, McClelland, Maier & Neustadt

[57] ABSTRACT

A male part such as a needle valve (1) is guided in a bore such as that of a nozzle (2) in a manner such that male part exhibits a passage function of a pressurized fluid (1A) and the bore works with a volume (3, 6) subjected to the effect of the pressure.

9 Claims, 2 Drawing Sheets

CYLINDRICAL GUIDE DEVICE WITH OPERATING PLAY COMPENSATION FOR FUEL INJECTION SYSTEM

BACKGROUND OF THE INVENTION

This invention relates to an improvement of flow control devices built into a fuel injection system.

The description will be made in connection with a nozzle holder usually placed in the cylinder head of a combustion engine without restricting its range of application. Actually, this can extend to any element for control of the flow of fuel or control fluid, this element being attached to a pump or a line or a hydraulic regulation unit or on a nozzle holder.

Injection systems are known where an electromagnetic element allows the amount of fuel introduced into the combustion chamber of an engine to be regulated with precision, by the movement of a slide valve or a flap or a needle valve.

French patent 69.36.516, for example, describes such a control element principally consisting of a needle valve, moved with the assistance of a solenoid, moving in a nozzle. At approximately midheight of the guide zone of said needle valve there is provided an annular groove, which is connected to a pressurized liquid circuit, the latter communicating with the inside of the nozzle valve, the circuit comprising two sealing seats alternately open or closed, according to the electromagnetic control, thus obtaining the flow control function. The above-designated needle valve limits the leakage of the pressurized liquid present in the annular groove toward the low-pressure circuit thanks to its very precise adjustment in the nozzle; the value of the leakage flow depends on the difference in pressure prevailing between the high-pressure and low-pressure circuits, the space between the needle valve and the nozzle (play), the diameter of the needle valve and the length of its bearing surfaces, the type of fluid and its temperature.

It is known that in these systems, a part of the fluid leakage depends on the frequency of the operation and/or the warm-up time, this part being called "dynamic operation leakage," another part of the leakage depending on the play between the mobile parts as indicated above, this part being termed "static leakage" since its value does not change as a function of the control frequency.

It is known that the power absorbed by an injection system of this type depends for a given pressure on the amount injected, the control leakage and the static leakage. It is also known that the flow generation device supplying the system should be dimensioned to provide for any flow necessary.

Interest is therefore seen in reducing the static leakage, this being a large part of the energy lost, so as to reduce the size of the generator of the pressurized fluid and to improve the energy balance.

SUMMARY OF THE INVENTION

This invention has the object of reducing the value of said "static" leakage.

As already cited above, the elements governing the value of the leakage flow are known.

The pressure is established by the use of the system in an engine. Since its value is regulated in an optimal way, no intervention in this value is possible to solve the leakage problem.

The viscosity is also established by use of a specific fluid.

The temperature is hard to adjust, since the device operates close to a significant source of heat.

The geometric dimensions are:

The diameter is generally chosen to meet other operational conditions but usually is of smaller dimension to limit the value of the mobile weights.

The length of the bearing surfaces are a compromise between the sealing requirements, the value of the mobile weights and the possibilities for the machinability of the bores.

The guide play or space between needle valve and nozzle is a compromise between an easy sliding of the needle valve, with regard to weak forces acting on it, and a limitation of leakage.

All this can be put in the form of a simplified equation such as:

$$F = K \frac{D}{L} E^3$$

F: value of leakage flow
D: diameter
E: space between needle valve and nozzle
K: coefficient
L: length of space where the significance of parameter E (play) which acts according to its third power, the value of play being generally several millionths of a meter, is seen.

It is well known by one skilled in the art that the design of the needle valve and/or the nozzle for example in uniformly distributing the play along the circumference of the needle valve (by the installation of the balancing groove(s)) allows for the slight reduction of the value of the leakage flow, these arrangements providing only a partial solution to the problem encountered.

The solution consisting in placing a seal between the needle valve and the nozzle is also known, but this, by its operation, generates friction forces incompatible with the use of the control system.

It is also known that the pressure acting in an enclosure creates a deformation of its inside dimension and, in our application, the pressure continuing to decrease along the generatrices of the sealing parts causes an increase of the inside diameter of the guide nozzle of the needle valve therefore resulting in an actual operation play radically different from that initially established. The value of this deformation obviously depends on the geometric dimensions of the nozzle and partially on the needle valve.

A solution to this problem would be to increase the thickness of the nozzle, but this is detrimental to the size and/or saving of material.

This invention has further objects of avoiding these drawbacks and a means for guiding a part called a needle valve in a bore called a nozzle, which will not be subjected to variations of play such as described above.

According to an essential feature, the male part exhibits a passage function of a pressurized fluid, while the bore works with a volume subjected to the effect of pressure to cancel and/or reverse the increase of the guide play of this male part in this bore.

BRIEF DESCRIPTION OF THE DRAWINGS

Other features of the invention will be evident in the following description of six preferred embodiments, given by way of nonlimiting examples, in reference to the accompanying drawings in which.

DETAILED DESCRIPTION OF THE PREFERRED EMBODIMENTS

Figure 1:
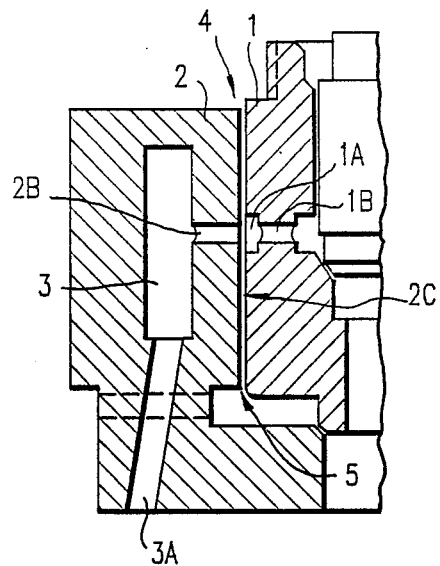
FIG. 1 represents a structural and diagrammatic view of a first basic embodiment.

According to the invention, the device represented in FIG. 1 comprises a needle valve 1 placed in a bore of a nozzle 2, this needle valve being able to move with the assistance of a known drive system such as a solenoid (not shown) to produce flow control with the assistance of known devices whose description is outside the present subject. The nozzle 2 is constructed in such a way that an annular 3 is created, the volume having a surface area facing the bore whose value is a major portion of the value of the surface area of the bore. A pressurized fluid passage circuit 1A is provided, for example, on needle valve 1 by an annular groove. In FIG. 1, circuit 1A is extended by circuit 1B for a purpose not described which is outside the scope of the invention.

Figure 2:
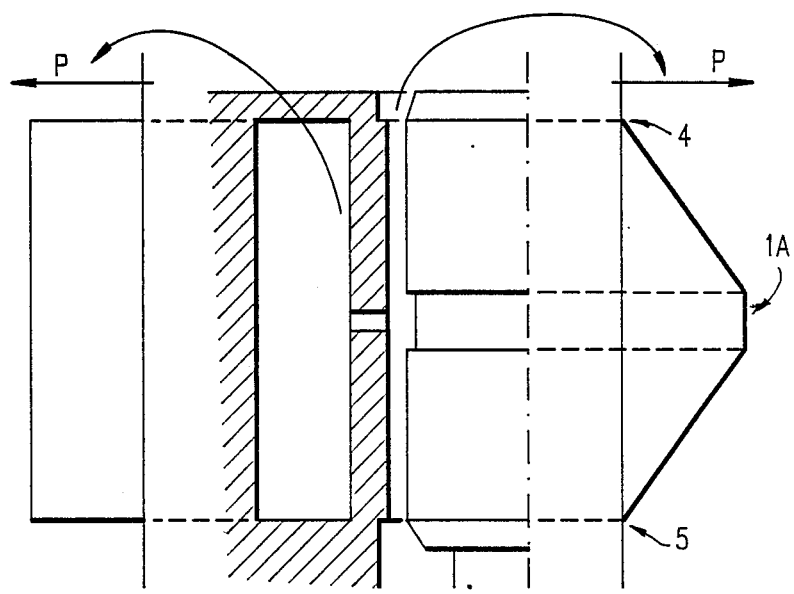
FIG. 2 represents a distribution curve of the pressure acting on this device.
Figure 3:
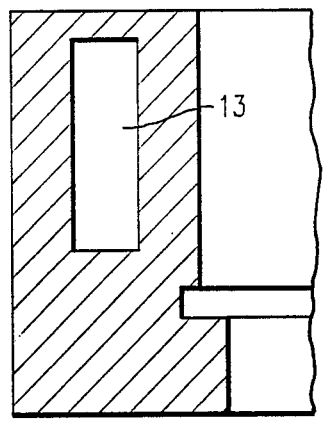
FIGS. 3 to 7 represent diagrammatic views of the five other embodiments.
Figure 4:
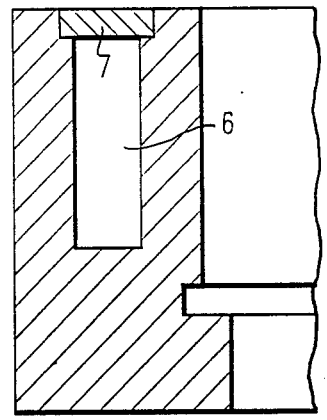
Figure 5:
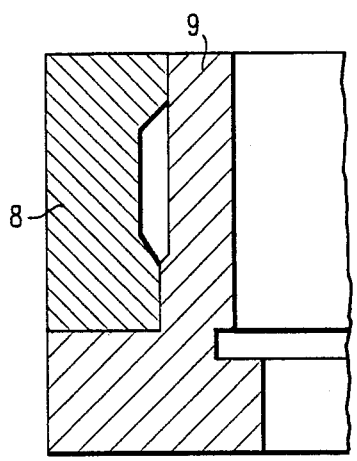
Figure 6:
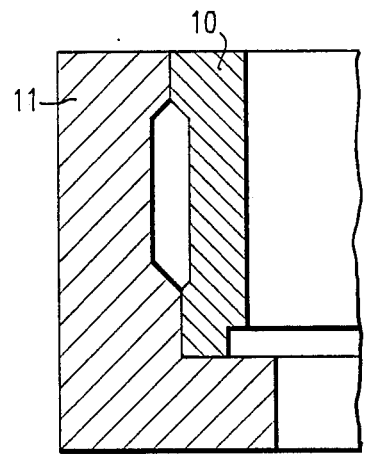

The pressurized fluid arriving by duct 3A fills volume 3, the pressure acting on the outside cylindrical surface of nozzle 2 (see FIG. 2). The axial height of this surface is delimited by the axial height of volume 3. The pressure also acts on the fluid being distributed by groove 1A after having flowed through duct 2B on the inside surface of nozzle 2. A flow of fluid is thus established in space 2C going from groove 1A in the direction of the two ends 4 and 5 of the contact between needle valve 1 and nozzle 2 defining two sealing bearing surfaces. The pressure is obviously at its maximum value in the vicinity of 1A, while its value is minimal at points 4 and 5. All along the sealing bearing surface, the pressure progressively decreases as a function of the distance relative to passage 1A, this decrease depending on the thickness of space 2C along the sealing bearing surfaces. For example, if space 2C remains constant, the variation of the pressure is linear as represented in FIG. 2.

Elements 1A, 1B and 2B together form passage means traversing play space 2C for communicating the volume 3 with the needle valve.

It is known that the deformations of this type of part are essentially due to the difference of pressure prevailing between the inside and the outside of the part (LAMÉ equations).

It is therefore seen that with this type of design, where the materials making up the guide are subjected on their outside to a constant pressure, and on their inside to a pressure varying gradually along said guide, there results a differential pressure all along the bearing surface which tends to cancel at the position of groove 1A the variation of space 2C or to make it decrease; therefore to cancel, in part, a variation of the initial play, and, for the other part, to reduce this same initial play.

It therefore clearly appears that the described device, by reducing the operational play as a function of the pressure, limits the flow of the static leakage flowing out into space 2C.

FIGS. 3, 4, 5 and 6 respectively show:
- a volume 13 buried in a solid part,
- a volume obtained by providing a an annular groove 6 partially blocked by a seal 7,
- a volume obtained by the adaptation of a female ring 8 on a male main body 9 having the bore,
- and a volume obtained by the adaptation of a bush 10 comprising the bore in a hollow main body 11.

Figure 7:
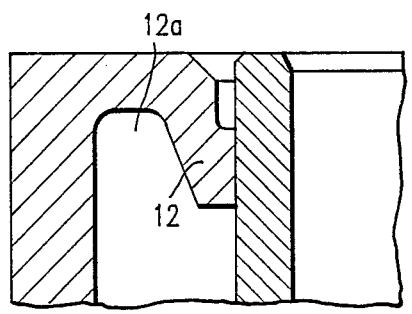

The sealing of this volume is made by welding or clamping the constituent parts and by appropriate seals, such as a prestressed metal lip 12, represented in FIG. 7. The lip 12 forms a subvolume 120 which presses inwardly on the lip to improve sealing.

I claim:

1. A pressurized fluid transfer system comprising:
a nozzle having a cylindrical bore;
a needle valve slidably positioned in said bore with sufficient play for said needle valve to freely slide in said bore; and
means for transferring a pressurized fluid to said needle valve, comprising:
   (a) an annular volume in said nozzle, a side of said volume facing said bore having a surface area whose value comprises a major portion of the value of the surface area of said bore,
   (b) means for communicating said volume with a source of the pressurized fluid, and
   (c) passage means traversing said play for communicating said volume with said needle valve whereby said pressurized fluid can fill said play;
wherein a length of said volume along the axis of said bore is selected to be sufficient that a pressure of pressurized fluid therein substantially cancels any increase in said play due to distortions of said nozzle resulting from said pressurized fluid in said play.

2. The system of claim 1 wherein said nozzle comprises a single solid part defining said volume.

3. The system of claim 1 wherein said nozzle comprises a solid part having an annular groove including a seal closing said groove, wherein said volume is defined by said sealed groove.

4. The system of claim 1 wherein said nozzle comprises a main body forming said bore and a ring mounted on said main body, said volume being defined between said main body and said ring.

5. The system of claim 1 wherein said nozzle comprises a main body and a bush fitted in said main body and forming said bore, said volume being defined between said main body and said bush.

6. The system of claim 4 wherein said main body and said ring are welded to one another.

7. The system of claim 5 wherein said main body and said bush are welded to one another.

8. The system of claim 4 wherein said ring defines a tip extending axially inward to form a subvolume pressing said lip onto said main part so as to improve sealing between said ring and said main body.

9. The system of claim 5 wherein said main body defines a lip extending axially inward to form a subvolume pressing said lip onto said bush so as to improve sealing between said bush and said main body.

* * * * *